United States Patent Office 3,495,146
Patented Feb. 10, 1970

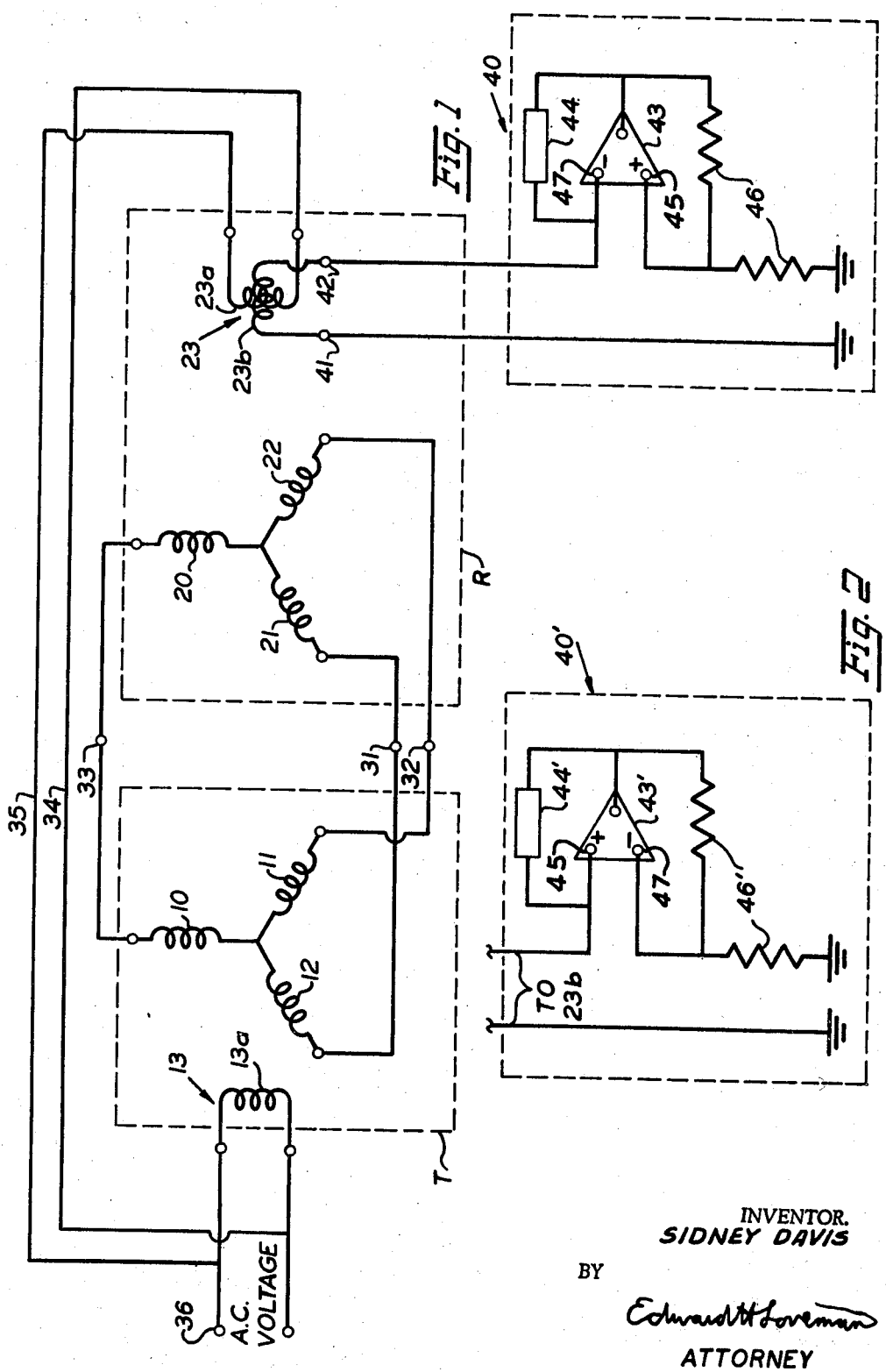

3,495,146
SYNCHRO APPARATUS
Sidney Davis, East Norwich, N.Y., assignor to Vernitron Corporation, New York, N.Y., a corporation of Delaware
Filed Nov. 18, 1968, Ser. No. 776,744
Int. Cl. G05b
U.S. Cl. 318—18                    10 Claims

ABSTRACT OF THE DISCLOSURE

A synchro is disclosed which includes a stator and a rotor having a primary coil excited by an AC potential and a secondary, quadrature coil in which is induced a quadrature current in response to the nonalignment of the synchro rotor with respect to the rotor of a reference synchro whereby the torque capacity of the synchro is proportional to quadrature current. Means are provided to reduce the impedance of the quadrature coil whereby quadrature current and thereby torque capacity are substantially increased.

---

This invention relates to synchros and more particularly to a synchro employing novel means to reduce the impedance of the quadrature coil provided on the synchro rotor.

In copending U.S. patent application Ser. No. 734,704, filed June 5, 1968, in the name of the instant inventor and entitled, "Synchro Apparatus," there is described a common form of remote torque transmission system and a method for increasing torque capacity thereof by amplifying the quadrature current induced in a quadrature coil mounted on the synchro rotor.

Thus, as set out in greater detail in the aforementioned application, a common form of remote torque transmission system may be comprised of a torque transmitter and a torque receiver wherein a Y-connected winding of the transmitter stator is electrically connected to a corresponding Y-connected winding of the receiver stator, and the receiver and transmitter each have wound rotors which are excited from an AC reference source. If both rotors are in the same magnetic or electrical position, the same voltages are induced in each stator, and no current flows in the stators. Should the rotor position of one, i.e., the torque transmitter, be slightly different from the rotor position of the torque receiver, then the voltage unbalance in the stator legs results in a current flow, producing a magnetic flux field in the receiver which in turn induces a voltage in a quadrature axis coil mounted on the rotor of the receiver. This voltage in turn generates what is commonly known as quadrature current or cross field current, whereas the current flowing in the primary coil of the rotor is called the direct field current.

As is well known, the torque capacity of the receiver is approximately proportional to the product of the flux density generated by the direct field current multiplied by the aforementioned quadrature current. Thus the improvement claimed in the aforementioned application is directed to the concept of amplifying the quadrature current to produce increased torque capacity.

This method does, in fact, increase the quadrature current and thereby increases the torque capacity typically by 50 to 60 percent. It has been found that this increase, however, is often insufficient to enable the torque receiver to drive a useful load and it has frequently been the practice to use an instrument servomechanism to drive the load rather than use a simple, inexpensive torque receiver.

The instant invention, like the synchros of the prior art includes a stator comprised of a plurality of windings connected to a source of reference signals and a rotor which includes a primary winding and a secondary quadrature winding oriented at 90 electrical degrees with respect to the primary winding. However, and in contradistinction to the prior art, the instant invention proposes to reduce the impedance of the quadrature coil thereby substantially increasing quadrature current and more effectively increasing the torque capacity of the synchro. Thus, the torque capacity of a synchro may be increased from five to ten times by merely utilizing the present invention.

As will be explained in greater detail, the means employed in the instant invention for reducing the impedance of the quadrature coil of the synchro preferably comprises a feedback amplifier circuit connected to the quadrature coil for establishing an effective impedance (including the impedance of the quadrature coil and the impedance of the feedback amplifier circuit) which is less than the impedance of the quadrature coil alone. Although various embodiments of the feedback amplifier circuit are disclosed, the net effect of each is to produce a negative impedance which, when combined with the impedance of the quadrature coil, produces the aforementioned reduced effective impedance.

Accordingly, it is an object of the instant invention to provide a synchro in which the torque capacity thereof is substantially increased.

Another object of the instant invention is to provide a remote torque transmission system comprised of a torque receiver and a torque transmitter and capable of driving heavier loads than conventional systems.

Still another object of the instant invention is to provide such a synchro and torque transmission system employing same which includes means for increasing the quadrature current induced in a quadrature coil mounted on the rotor of the synchro.

Yet another object of the instant invention is to provide such a synchro, and transmission system employing same, which increases the aforementioned quadrature current by decreasing the impedance of the quadrature coil in which such current is induced.

Yet another object of the instant invention is to provide such a synchro and transmission system employing same, which reduces quadrature coil impedance by employing a feedback amplifier circuit having a negative impedance such that the effective impedance of the amplifier and quadrature coil is less than that of the quadrature coil alone.

Yet another object of the instant invention is to employ such a feedback amplifier circuit which can take various forms, all of which have the net effect of producing a negative impedance which can be electrically combined with the impedance of the aforementioned quadrature coil.

These and other objects and many of the attendant advantages of this invention will readily appreciate as the same becomes better understood by reference to the following detailed description when considered in connection with the accompanying drawings; wherein FIG. 1 is a schematic circuit diagram of a torque transmission system in accordance with the present invention; and FIG. 2 is a schematic circuit diagram of an alternative embodiment of a feedback amplifier circuit which may be employed in the instant invention.

Referring now to the drawings, wherein like reference numerals designate like parts throughout the figures thereof, there is shown in FIG. 1 a basic synchro torque transmission system which includes a torque transmitter T and a torque receiver R. The torque transmitter contains a stator, shown as wound with three-phased coils 10, 11, 12 and a rotor 13 having a coil 13a. The torque receiver has a similar stator with coils 20, 21, 22 and a rotor 23 with a primary rotor coil 23a. Transmitter and receiver stators are connected as schematically indicated by terminals 31, 32 and 33. The rotor coils 13a and 23a are connected by lines 34, 35 and supplied from a source of alternating current potential 36.

As well known in the art, in operation, when the transmitter and receiver rotors 13 and 23 are synchronized to the same angle, the voltages induced in the stator legs of the transmitter and the receiver will be balanced; no current will flow in these legs; and no torque is exerted on the receiver rotor. However, when the rotors are not synchronized, the voltage unbalance which results produces a current flow and resulting AC magnetic flux field in the receiver which in turn induces a voltage in the quadrature axis coil 23b mounted on the rotor 23 of the receiver R at 90 electrical degrees with respect to the primary coil 23a. This induced voltage produces what is commonly designated the quadrature current, also known as the cross field current, and it is to be distinguished from the current flow in the primary coil 23a called the direct field current. As was suggested previously, and as is well known, the torque capacity of the receiver is approximately proportional to the product of the flux density generated by the direct field current multiplied by the quadrature current such that an increase in quadrature current will increase the torque capacity of the receiver.

As noted previously, the instant invention proposes to increase quadrature current induced in the quadrature coil 23b by reducing the impedance thereof. To that end, the invention employs a feedback amplifier circuit generally designated as reference numeral 40 connected to the quadrature coil 23b (as for example by suitable slip rings schematically illustrated at 41, 42) for establishing an effective impedance (which includes the impedance of the quadrature coil 23b and the impedance of the feedback amplifier circuit 40) which is less than the impedance of the quadrature coil 23b alone. That the combined impedance of the elements 23b and 40 can be less than the impedance of the coil 23b alone is due to the fact that the feedback amplifier circuit 40 (or the alternative embodiment 40' of FIG. 2) has the effect of producing a negative impedance therefor. This negative impedance when combined with the impedance of the coil 23b reduces, the net effective impedance.

The feedback amplifier circuit 40 of FIG. 1 is commonly designated a negative admittance circuit and employs a conventional operational amplifier 43 and feedback impedance and resistive networks 44 and 46 respectively. It will be appreciated that in the feedback amplifier circuit 40, the coil 23b is connected to a negative input terminal 47 of the amplifier 43.

In FIG. 2, the feedback amplifier circuit 40' is basically similar to the feedback amplifier circuit 40 of FIG. 1 and therefore like numerals have been used to indicate like elements. The essential difference between the two is that the coil 23b is connected to a positive input terminal 45 of the amplifier 43. Moreover, in FIG. 1, the feedback impedance network 44 is connected to a negative terminal 47 and the resistive network 46 is connected to a positive terminal 45 of the amplifier 43, whereas in FIG. 2, impedance network 44' is connected to the positive terminal 45 and the resistive network 46' is connected to the negative terminal 47. The circuit 40' is commonly known as a true negative impedance circuit. In both circuits, the impedance network 44 and 44' may take the form of conventional negative resistance, capacitance, inductance or any combination thereof.

It is to be appreciated, however, that many feedback amplifier circuits, and indeed many altogether different types of circuits might be utilized in carrying out the teachings of the instant invention. The essential requirement is that the circuitry selected has the end result of producing a negative input impedance such that when combined with the impedance of the quadrature coil 23b, the resultant impedance is less than the impedance of coil 23b alone. In this event, it has been found that the torque capacity of a conventional torque receiver may be increased to as much as ten times the normal synchro torque capacity.

It should further be understood that the foregoing specification relates to only a preferred embodiment of the invention, and that it is intended to cover all changes and modifications of the example of the invention herein chosen for the purposes of the disclosure, which do not constitute departure from the spirit and scope of the invention.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

The invention claimed is:

1. In a synchro of the type having a stator and a rotor wherein said stator is comprised of a plurality of windings connected to a source of signal voltages and wherein a primary winding on said rotor is connected to a source of AC potential and wherein the torque capacity of said synchro is dependent on a magnetic field generated by said primary winding and a quadrature current induced in a secondary quadrature winding of said rotor, the improvement which comprises,
    an impedance means having a negative sign and connected to said secondary quadrature winding whereby said quadrature winding will have an impedance less than the short circuit value of said quadrature winding.

2. In the synchro, as recited in claim 1, wherein said impedance means comprises,
    a feedback amplifier circuit connected to said secondary winding for establishing an effective impedance, including the impedance of said secondary coil and the impedance of said feedback amplifier circuit, which is less than the impedance of said secondary coil alone.

3. In the synchro, as recited in claim 1, wherein said impedance means includes an amplifier having a feedback impedance and a feedback resistive network connected with respect thereto; the values of said feedback impedance and resistive network being preselectively chosen such that said feedback amplifier circuit has a negative impedance of preselected value.

4. In the synchro, as recited in claim 3, wherein said secondary quadrature winding is electrically connected in parallel with said feedback impedance to a positive input terminal of said amplifier and said resistive network is connected to a negative input terminal of said amplifier circuit to establish a negative impedance feedback amplifier circuit.

5. In the synchro of claim 3, wherein said secondary quadrature winding is electrically connected parallel with said feedback impedance to a negative input terminal of said amplifier and said resistive network is connected to a positive input terminal of said amplifier to establish a negative admittance feedback amplifier circuit.

6. A remote torque transmission system comprising:
    a synchro torque transmitter, said transmitter having stator windings and a rotor having a winding connected to an energizing source;
    a synchro torque receiver having stator windings electrically connected to the stator windings of said synchro torque transmitter, said receiver also including a rotor having a primary winding connected to said energizing source and a secondary winding wound in quadrature to said primary winding; and an impedance means having a negative sign and connected to said secondary quadrature winding whereby said quadrature winding will have an impedance less than the short circuit value of said quadrature winding.

7. The transmission system, as recited in claim 6, wherein said impedance reducing means includes a feedback amplifier circuit connected to said secondary winding of said torque receiver rotor for establishing an effective impedance, including the impedance of said secondary coil and the impedance of said feedback amplifier circuit which is less than the impedance of said secondary coil alone.

8. The transmission system, as recited in claim 6, wherein said impedance reducing means includes an amplifier having a feedback impedance and a feedback resistive network connected with respect thereto; the values of said feedback impedance and resistive network being preselectively chosen such that said feedback amplifier circuit has a negative impedance of preselected value.

9. The transmission system, as recited in claim 8, wherein said secondary quadrature winding is electrically in parallel with said feedback impedance to a positive input terminal of said amplifier and said resistive network is connected to a negative input terminal of said amplifier thereby to establish a negative impedance feedback amplifier circuit.

10. The transmission system of claim 8 wherein said secondary quadrature winding is electrically connected in parallel with said feedback impedance to a negative input terminal of said amplifier and said resistive network is connected to a positive input terminal of said amplifier thereby to establish a negative admittance feedback amplifier circuit.

References Cited
UNITED STATES PATENTS 2,810,119  10/1957  Brown.

BENJAMIN DOBECK, Primary Examiner

U.S. Cl. X.R.

318—23.5, 24